United States Patent

[11] 3,578,268

[72] Inventor Kenneth C. Kramer
Thousand Oaks, Calif.
[21] Appl. No. 792,366
[22] Filed Jan. 21, 1969
[45] Patented May 11, 1971
[73] Assignee Lear Siegler, Inc.
Santa Monica, Calif.

[54] AUTOMATIC PITCH CONTROL SYSTEM
3 Claims, 3 Drawing Figs.

[52] U.S. Cl. .................................................. 244/77
[51] Int. Cl. .................................................... B64c 13/08
[50] Field of Search.......................................... 244/77, 82
(D&F)

[56] References Cited
UNITED STATES PATENTS

| | | | |
|---|---|---|---|
| 2,957,652 | 10/1960 | Masel............................ | 244/77 |
| 3,018,071 | 1/1962 | Horton et al.................. | 244/77 |
| 3,378,217 | 4/1968 | Diani............................ | 244/82 |

FOREIGN PATENTS 924,059  4/1963  Great Britain................ 244/77

*Primary Examiner*—Milton Buchler
*Assistant Examiner*—James E. Pittenger
*Attorney*—Christie, Parker & Hale ABSTRACT: The elevator of an aircraft and a tab associated with the elevator are positioned by servoactuators both of which are driven by a common servoamplifier. In an automatic pitch-maneuver mode of operation, a constant pitchup trim bias signal is additively combined with the signal from the servoamplifier that drives the trim servoactuator. Prior to the execution of the pitch maneuver, the high-gain servoloop formed by the system overpowers the trim bias signal, thereby nullifying its effect. During the execution of the maneuver, the trim bias provides the added pitchup authority and a pitchup command in case of passive failure. The trim bias signal shifts the response of the aircraft to the pitch maneuver command so this response is unsymmetrical, having greater authority in the pitchup direction.

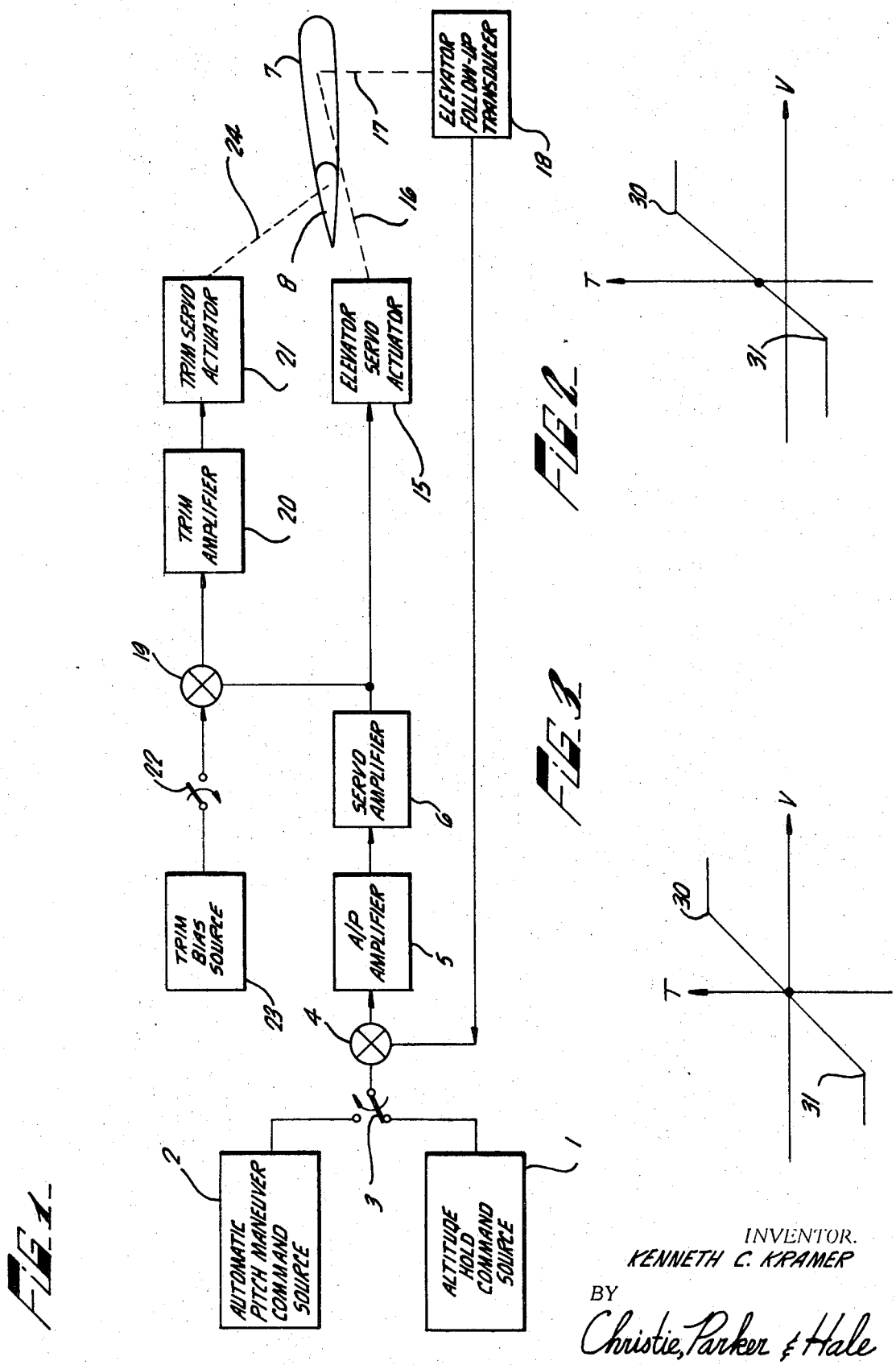

3,578,268

AUTOMATIC PITCH CONTROL SYSTEM

BACKGROUND OF THE INVENTION

This invention relates to the automatic control of the pitch of an aircraft, and more particularly, to an improved control system for trimming an elevator tab during an automatic pitch maneuver.

In some automatic flight control systems, the aircraft has the capability of operating in different automatic flight modes one of which executes an automatic pitch maneuver. Typical pitch maneuvers that may be executed automatically are flaring, toss bombing, and terrain following. Several serious problems are presented in achieving compatibility between the design requirements of an automatic pitch maneuver mode and other automatic flight modes such as an altitude hold mode.

First, the authority given to the flight control system in other automatic flight modes is generally too limited to perform a fast pitch maneuver. To protect against the possibility that a malfunction in the other automatic flight modes might damage the aircraft or cause it to go out of control, it is a common practice to limit the authority of the system over the pitch control surfaces of the aircraft. In contrast, fuller authority is desirable in the automatic pitch maneuver mode to enable the aircraft to pitch up, i.e., to raise its nose, quickly in response to a pitch maneuver command signal. However, the provision of fuller authority in a pitch maneuver on a symmetrical basis, i.e., the same authority to pitch the nose of the aircraft down as to pitch it up, can also prove dangerous in the event of a malfunction because the contemplated pitch maneuvers are generally initiated in close proximity to the ground.

Second, a disaster could occur if a loss of automatic control takes place at the time of the initiation of the automatic pitch maneuver or a passive failure occurs during the execution of the pitch maneuver because of the small margin for error allowed by the close proximity to the ground. If a passive failure occurs during the execution of a flare maneuver, for example, the nose of the aircraft actually pitches down because of the lag in the response of the elevator tab.

Third, the actual pitch profile of the aircraft that results in an automatic pitch maneuver usually deviates from the programmed profile because the elevator surfaces are out of trim. The elevator tab cannot be made to operate safely as fast as the required changes in trim. Therefore, inconsistent pitch maneuvers ensue.

SUMMARY OF THE INVENTION

According to the invention, in an automatic pitch maneuver mode of operation a constant pitchup trim bias signal is additively combined with the signal that drives the servoactuator for the elevator tab of the aircraft. Prior to the execution of the automatic pitch maneuver, the high-gain servoloop formed by the system overpowers the trim bias signal, thereby nullifying its effect. During the execution of the automatic pitch maneuver, however, the trim bias signal provides added pitchup authority and a pitchup command in case of passive failure. The trim bias signal shifts the response of the aircraft to the pitch maneuver command signal in a direction to increase the pitchup authority, at the same time reducing the pitch down authority. In other words, an unsymmetrical response to the command signal results, additional servo authority being given for pitchup movement of the aircraft and a corresponding amount of authority being taken away for pitch down movement of the aircraft. Thus, the added authority required to execute automatic pitch maneuvers quickly is available for pitchup movement of the aircraft without increasing the authority available in the other automatic flight modes or the authority available for pitch down movement of the aircraft. Consequently, automatic pitch maneuvers can be quickly executed without compromising the safety of the pilot and the aircraft.

The presence of the trim bias signal ensures that the nose of the aircraft will pitch up if loss of the automatic control occurs when the automatic pitch maneuver is initiated or if a passive failure takes place in the course of the execution of the maneuver. Further, consistent, substantially error-free pitch maneuver profiles can be achieved because the added authority practically eliminates out-of-trim error.

BRIEF DESCRIPTION OF THE DRAWING

A specific embodiment of the best mode contemplated of carrying out the invention is illustrated in the drawing, in which:

FIG. 1 is a block diagram of the pitch axis of an automatic flight control system that incorporates the principles of the invention;

FIG. 2 is a graph of the response of an aircraft to the command signal applied to the system of FIG. 1 in an automatic pitch maneuver mode of operation; and FIG. 3 is a graph of the response of an aircraft to the command signal applied to the system of FIG. 1 in other modes of operation.

DESCRIPTION OF THE SPECIFIC EMBODIMENT

In FIG. 1, conventional altitude hold command source 1 and automatic pitch maneuver command source 2 generate command signals to control automatically the pitch of an aircraft. The particular nature and design of sources 1 and 2 are not essential to the invention. Sources 1 and 2 are alternatively coupled to one input of a summing junction 4 by a mode selection switch 3. An autopilot amplifier 5 and a servoamplifier 6 are connected in tandem between the output of summing junction 4 and the drive channels for the pitch control surfaces of the aircraft, namely, an elevator 7 and a tab 8.

One drive channel comprises an elevator servoactuator 15 that is directly driven by the output of servoamplifier 6. A mechanical linkage 16 connects actuator 15 to elevator 7. A mechanical linkage 17 connects elevator 7 to an elevator followup transducer 18, which produces an electrical signal proportional to the position of elevator 7. The output of transducer 18 is electrically coupled to the other input of summing junction 4.

The other drive channel comprises a summing junction 19, a trim amplifier 20, and a trim servoactuator 21 connected in tandem. One input of summing junction 19 is connected to the output of servoamplifier 6 and the other input of summing junction 19 is connected through a switch 22 to a trim bias source 23. Source 23 produces a signal having a constant amplitude that serves to bias tab 8 to a pitchup position in a pitch maneuver mode, as described in more detail below. A mechanical linkage 24 connects actuator 21 to tab 8.

When the automatic flight control system of FIG. 1 is operating in an altitude hold mode, switch 3 is in the lower position and switch 22 is open, as shown in FIG. 1. Typically, command source 1 includes a barometric altimeter, that senses the altitude of the aircraft, a synchronizer that establishes a predetermined altitude to be held, and a summing junction to which the altimeter and synchronizer are connected to provide a command signal that represents the difference therebetween. As the aircraft deviates from the predetermined altitude to be held, the deviation is sensed by the altimeter and the command signal is generated. The pitch control surfaces of the aircraft are repositioned responsive to this command signal in a sense to reduce the deviation from the altitude to be held. In other words, a high-gain servoloop is formed because the command signal from source 1 is continually driven toward a null condition. The graph of FIG. 3 represents the response of the aircraft in terms of torque T to the driving voltage V at the output of servoamplifier 6. This response rises linearly from zero to points 30 and 31. From there it flattens out, which represents the limit imposed upon the authority of the servoloop in this mode. It is to be noted that the response is symmetrical about the voltage axis.

In order to engage the automatic pitch maneuver mode, switches 3 and 22 are moved into the positions indicated by the arrows. The response of the aircraft to the driving voltage at the output of servoamplifier 6 in the pitch maneuver mode is represented by the graph in FIG. 2. The trim bias shifts the response of the aircraft to the driving voltage at the output of servoamplifier 6 so this response becomes unsymmetrical, i.e., the pitchup authority of the pitch control surfaces is substantially greater than the pitch down authority. In other words, point 30 occurs at a much larger torque than point 31; and in the absence of a driving voltage from servoamplifier 6 a torque is applied to the aircraft that causes it to pitch up. After this mode is engaged and prior to the actual execution of the pitch maneuver, the altitude of the aircraft is still held constant. Thus, source 2 generates a command signal that is still continually driven toward zero. The high-gain servoloop that is formed overrides the signal applied to summing junction 19 from source 23, thereby nullifying its effect on the system. During the execution of the pitch maneuver, the command signal generated by source 2 continually changes in one direction according with the desired pitch maneuver profile. As a result, the trim bias from source 23 does affect the response of the aircraft.

I claim:

1. In an automatic flight control system for an aircraft, apparatus for controlling the elevator of the aircraft and its associated tab in an automatic pitch maneuver, the apparatus comprising a trim actuator for positioning the tab responsive to an electrical driving signal, an elevator actuator for positioning the elevator responsive to an electrical driving signal, and a command signal source coupled to the actuators to provide the driving signals therefor, the command signal source forming a servoloop that drives the command signal toward a null condition prior to the execution of the automatic pitch maneuver and continually changes the command signal in one direction during the execution of the pitch maneuver, wherein the improvement is a trim bias source that produces a constant bias signal and means for combining the bias signal with the command signal applied to the trim actuator in a sense to cause the aircraft to pitch up so as to make the response of the aircraft to the command signal during the execution of the pitch maneuver unsymmetrical.

2. In an automatic flight control system for an aircraft, apparatus for executing an automatic pitch maneuver comprising:
   an elevator control surface on the aircraft;
   a tab control surface on the aircraft associated with the elevator control surface;
   an elevator actuator for positioning the elevator control surface responsive to an electrical input signal;
   a trim actuator for positioning the tab control surface responsive to an electrical input signal;
   means for generating an electrical followup signal representative of the position of the elevator;
   a source of pitch command signals, the source forming part of a servoloop that drives the command signal toward a null condition prior to the execution of the automatic pitch maneuver and continually changes the command signal in one direction during the execution of the automatic pitch maneuver;
   means for combining the command signal and the followup signal to produce an elevator drive signal;
   means for applying the elevator drive signal to the input of the elevator actuator;
   a source of trim bias that produces a constant bias signal at its output;
   means for combining the command signal and the bias signal to produce a tab drive signal that is unsymmetrical as a function of changes in the command signal; and
   means for applying the unsymmetrical tab drive signal to the trim actuator in a sense to pitch the aircraft up.

3. In an automatic flight control system for an aircraft, apparatus for controlling the pitch axis of the aircraft comprising:
   an elevator control surface on the aircraft;
   a tab control surface on the aircraft associated with the elevator control surface;
   an elevator actuator for positioning the elevator control surface responsive to an electrical input signal;
   a trim actuator for positioning the tab control surface responsive to an electrical input signal;
   means for generating an electrical followup signal representative of the position of the elevator;
   a first source of pitch command signals, for controlling the aircraft in an automatic pitch maneuver, the source forming part of a servoloop that drives the command signal toward a null condition prior to the execution of the automatic pitch maneuver and continually changes the command signal in one direction during the execution of the automatic pitch maneuver;
   a source of trim bias that produces a constant output signal;
   a first summing junction having first and second inputs and an output;
   means for coupling the followup signal generating means to the first input of the first summing junction;
   a second source of pitch command signal for controlling the aircraft in another automatic flight mode of operation;
   a mode selection switch for alternatively coupling the first and second sources to the second input of the first summing junction;
   a second summing junction having first and second inputs and an output;
   means for coupling the output of the first summing junction to the first input of the second summing junction;
   means for coupling the output of the second summing junction to the trim actuator;
   means for coupling the output of the first summing junction to the elevator actuator; and
   a switch for coupling the trim bias source to the second input of the second summing junction so as to bias the tab in a pitchup direction.